United States Patent [19]

Carroll

[11] 3,826,393

[45] July 30, 1974

[54] SELF-PROPELLED UNLOADER

[75] Inventor: Henry F. Carroll, Cary, Ill.

[73] Assignee: John Barchard, Crystal Lake, Ill. ; a part interest

[22] Filed: Mar. 28, 1973

[21] Appl. No.: 345,742

[52] U.S. Cl. .............................. 214/674, 280/43.23
[51] Int. Cl. ............................................ B66f 9/20
[58] Field of Search ........... 214/670, 671, 672, 673, 214/674; 280/34 R, 36 R, 41 R, 43, 43.12, 43.23; 187/10

[56] References Cited
UNITED STATES PATENTS

| | | | |
|---|---|---|---|
| 2,592,091 | 4/1952 | Weaver | 280/43.12 |
| 2,605,117 | 7/1952 | Hooz et al. | 280/41 R |
| 3,072,418 | 1/1963 | Becker | 280/43.12 |

Primary Examiner—Albert J. Makay
Assistant Examiner—Lawrence J. Oresky
Attorney, Agent, or Firm—Kenneth T. Snow

[57] ABSTRACT

A self propelled unloading vehicle having an adjustable and articulated lightweight compact frame enabling the vehicle to carry tremendous loads in a stable manner and with the center of gravity shiftable to a position between the front and rear wheels of the vehicle during the raising of the load. The unloader is capable of lifting loads from a raised bed, such as the bed of a truck, and then by telescoping certain frame members and angularly adjusting other frame members the load is, in effect, rocked off the raised bed without fear of losing the load by tipping during transport of the load.

3 Claims, 7 Drawing Figures

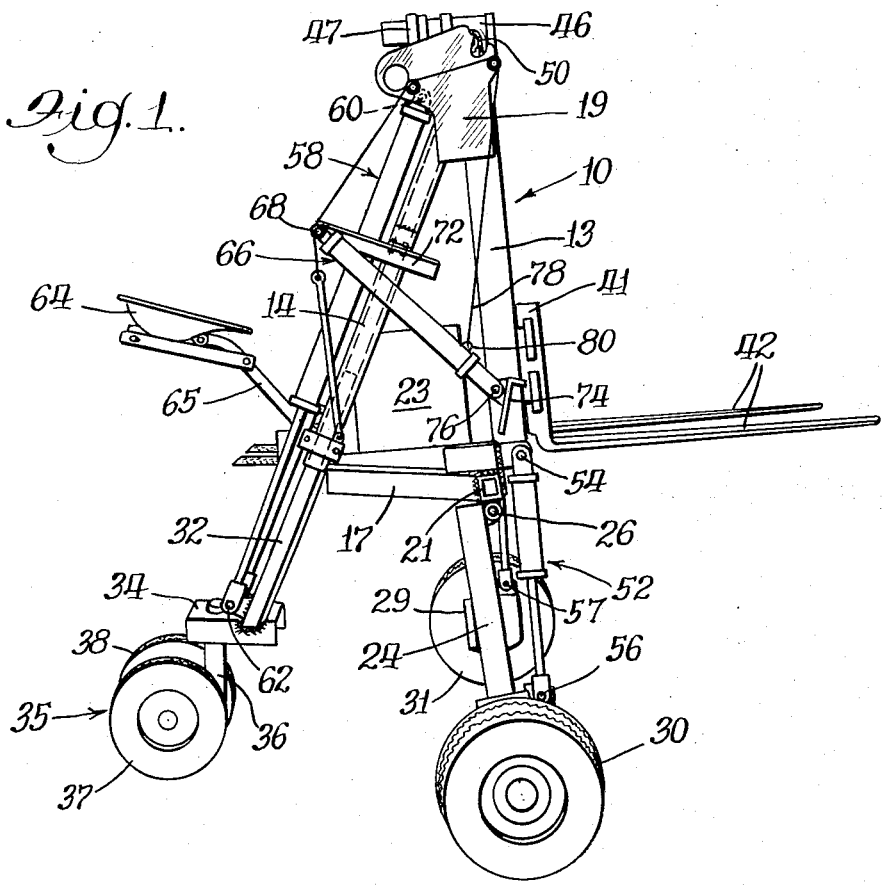

SELF-PROPELLED UNLOADER

BACKGROUND OF THE INVENTION

1. Field of the Invention

The present machine is primarily an unloader in contrast to the usual loading vehicle. The present vehicle is designed to effectively remove loads from a high surface and bring them down to a lower level for transport and subsequent use. The usual loader is a very heavy vehicle with substantial weighting on the frame acting as a counterbalance to keep the vehicle from tipping under the imposition of offset heavy loads thereon. Such a relatively standard loader has lifting forks extending forwardly from the vehicle. The forks are arranged to have movement up and down a vertical track. Some such loaders have vertical tracks which are capable of a small degree of adjustable inclination to obviate to some extent the tendency of the vehicle to tip forwardly under the weight of the offset lead. However, this angular adjustment is only slight and because of the inherent construction of the device the loads being carried cannot be brought back to a position over the vehicle frame and between the longitudinally spaced apart wheels of the vehicle. In contradistinction the present unloading vehicle stands upright against a bed to be unloaded like the usual loader, but then by suitable adjustment after the load is received the vehicle is rocked rearwardly and the wheel base extended in such a manner that the load is carried between the front and rear ground engaging wheels of the vehicle so that it is not necessary to have the frame filled with weights to counterbalance the loads being carried on the forward end.

2. Description of the Prior Art

A preliminary patent search did not produce any single prior patent or any combination of prior patents which showed or taught a device with the attributes as defined herein. The closest art is in fact remote but for completion of the record the U.S. Pat. Nos. found in the search were: Curtis, 2,174,415; Clarke, 2,849,132; Ulinski, 2,953,264; Baker, 3,071,270; Weaver, Jr., 3,235,109; Flint, 3,338,441; Bird, 3,642,085.

Several of these earlier patents show and describe self propelled loaders with a multiplicity of hydraulic cylinders and other operating means to give these loaders a variety of different characteristics. However, no one of these prior patents shows a frame in which the rear portion is telescoped so the vehicle may be raised or lowered and a front portion which has its wheels carried on angularly adjustable arms to cause a shifting of the vehicle from a very short wheel base to a longer wheel base for great stability in carrying loads. This adjustable arrangement permits the center of gravity to be shifted rearwardly to a position between the front and rear wheels of the vehicle. The Bird patent in particular shows a multiplicity of hydrualic cylinders to cause a swinging of various link members to maintain a box horizontally level regardless of the uneveness of the terrain.

SUMMARY OF THE INVENTION

A principal object of the present invention is to provide a novel lightweight compact unloading vehicle which by adjustment of certain frame elements may be effectively used to lift great loads in a safe manner.

Another important object of this invention is to provide a novel frame structure for a self-propelled unloading vehicle which is adjustable and articulatable so as to lift heavy loads from an elevated bed by a rocking of the vehicle and an extension of the wheel base of that vehicle.

Another important object of this invention is to provide a novel unloading vehicle having a very short, longitudinally extending frame for compactness in receiving a load but which frame is rockable and portions thereof contractable and extendable so the vehicle is completely stable during the carrying of heavy loads.

Another and further important object of this invention is to provide an unloading vehicle which is capable of bracing against a bed to be unloaded for breaking the load loose from the bed and thereafter by suitable adjustment of the component parts thereof, raising the load and rocking the vehicle in a manner to effectively shift the load rearwardly on the vehicle for absolute stability of the load on the vehicle and thereafter lowering the load on the vehicle for transport and ultimate use of the load.

A still further important object of this invention is to provide a novel A-frame for an unloading vehicle which houses a power plant for the vehicle and provides the front and rear main frame portions of the vehicle in which the rear is either raised or lowered by an extension or contraction of a lower end thereof and the front is either raised or lowered by a rocking of the lower end thereof.

Still a further important object of this invention is to provide a novel dual A-frame for the central mounting therewithin of an operating engine and the fronts of each side-by-side A-frames constituting the front of the vehicle which is carried by transversely spaced apart power driven wheels and the rears of each side-by-side A-frames constituting the rear of the vehicle which is carried by caster wheels.

Other and further important objects and advantages will become apparent from the disclosures in the following specification and accompanying drawings.

IN THE DRAWINGS:

FIG. 1 is a perspective view of the self propelled unloading vehicle of this invention as viewed generally from the side thereof and showing it in full vertical extension and with its shortest wheel base.

FIG. 2 is another perspective view of the vehicle taken generally from the side with the component frame parts in another adjusted position thereof with the frame lowered and the wheel base at substantially its maximum.

Figure 3:
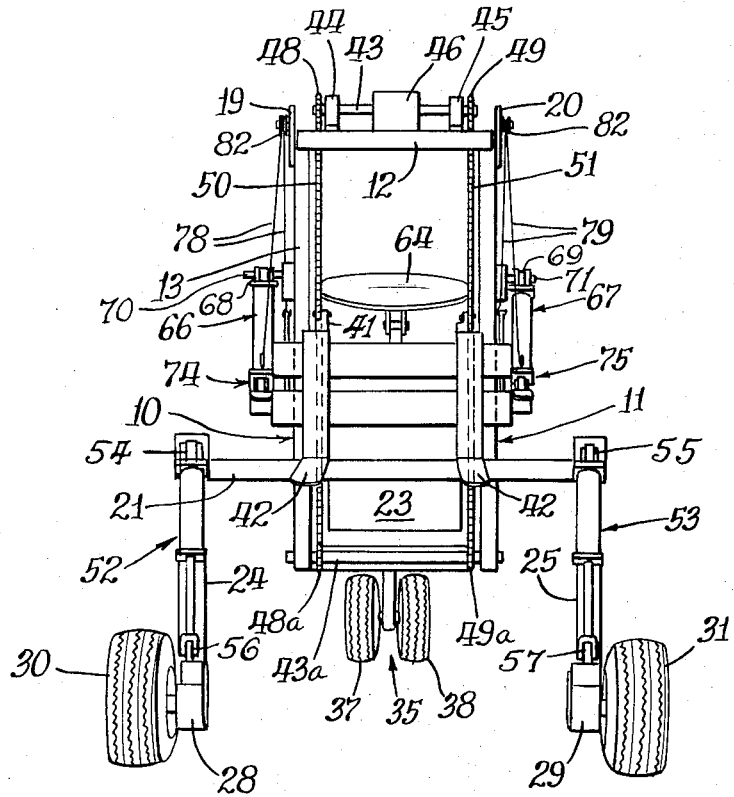
FIG. 3 is a front elevational view of the vehicle in the adjusted position of FIG. 1.

AS SHOWN IN THE DRAWINGS:

The reference numeral 10 indicates generally an A- frame which is arranged so that its legs are disposed longitudinally or in the direction of the travel of the vehicle of this invention. A transversely aligned and spaced apart A-frame 11 is joined with the A-frame 10 to constitute the fixed frame structure for the invention vehicle. A transversely extending beam 12 is weldably joined across the top to the apices of the side-by-side A-frames 10 and 11. Specifically the A-frame 10 has a forwardly and downwardly inclined front member 13 and a downwardly and rearwardly inclined rear member 14. Similarly the A-frame 11 includes a front frame member 15 which lies parallel to the front member 13, and a rear frame member 16 which lies parallel to the rear member 14 of the A-frame 10. A longitudinally extending frame member 17 is fixedly joined to the front and rear frame members 13 and 14 near their lower ends and similarly a longitudinally extending frame member 18 joins the frame members 15 and 16 near their lower ends. The longitudinally extending frame members 17 and 18 lie parallel to one another along the bottoms of the sides of the A-frames. A gusset plate 19 is mounted at the apex of the A-frame 10 and similarly a corresponding gusset plate 20 is mounted at the apex of the A-frame 11. These gussets act to reinforce the A-frames. A transverse beam assembly 21 is weldably or otherwise attached across the front wall of the vehicle frame near the lower ends of the front members 13 and 15 of the side-by-side A-frames 10 and 11. Another transverse member in the form of a beam 22 is weldably attached to the lower ends of the rear members 14 and 16 of the side-by-side A-frames. There is thus provided a complete box-like rigid frame for the vehicle of this invention comprising the two basic A-frames 10 and 11 and the several cross tie members extending in both transverse and longitudinal directions. The side-by-side front members 13 and 15 with the cross top beam 12 and the cross bottom beam 21 constitute the front of the vehicle. The side-by-side rear members 14 and 16 with the cross top beam 12 and the cross bottom beam 22 constitute the rear of the vehicle. The vehicle is built around this solid reinforced mixed frame. However, the frame is generally light in weight compared to other loading devices which are necessarily built with massive weights to counterbalance loads to be carried on forwardly extending lifting forks.

An engine 23 or other form of power plant is carried centrally within the confines of the generally tubularly constructed fixed frame. It is this engine which supplies the power to propel the vehicle and to operate all of the various components of this unloading device.

A link arm 24 is hingedly mounted beneath and at one outer end of the transversely extending elongated beam 21. A similar link arm 25 is hingedly mounted beneath and at the other outer end of the transversely extending elongated beam 21. The link arm 24 is hinged at its upper end at 26, and the link arm 25 is hinged at its upper end at 27. The other, generally lower end of the arm 24 carries a hydraulic motor housing 28. Similarly the lower end of the parallel arm 25 carries a hydraulic motor housing 29. A wheel 30 is mounted on the lower end of the swinging arm 24 adjacent to the motor 28 and constitutes a ground engaging drive wheel for the vehicle at that front corner of the vehicle. Similarly a wheel 31 is mounted at the lower end of the link arm 25 adjacent its hydraulic motor 29. The motors 28 and 29 are independent of each other and act to drive the vehicle in response to the operator's control. Again, the engine 23 is utilized as the source of power for the hydraulic motors 28 and 29 and suitable hosing delivers fluid under pressure from a pump or compressor (not shown in detail) adjacent the engine 23 down to the motors 28 and 29. The wheels constitute the means for propelling the subject vehicle. The wheels are transversely aligned and relatively widely spaced apart to provide good stability for the vehicle. The wheels are rotated on transverse axes for rotational movement in a generally longitudinal direction — the link arms 24 and 25 are effective downward extensions of the fronts of the A-frames 10 and 11.

The rear of the vehicle is provided with an extension arm 32 which has its upper end telescoped within the rear A-frame arm 14. A comparable extension arm 33 is disposed parallel to the arm 32 and also has its upper end telescoped. Here the arm 33 extends within the spaced apart rear A-frame member 16. The bottoms of the parallel extension arms 32 and 33 are joined by a transversely disposed box-like beam 34. A caster wheel assembly 35 supports the underside of the box beam 34. The caster assembly includes a vertical spindle 36, closely spaced apart caster wheels 37 and 38, a cross tie 39 between the wheels, and a longitudinally extending shaft 40. The cross tie 39 is journally mounted on the shaft 40 for rocking movement from side-to-side. The shaft 40 has an upwardly extending pintle which is journalled within the vertical spindle to permit the arcuate swinging movement of the caster wheels therearound. Truly this assembly 35 provides a full castering for the rear of the vehicle. The longitudinal spacing between the front drive wheels 30 and 31, and the rear caster wheels 37 and 38 constitute the wheelbase of the subject vehicle. As shown in FIG. 1 the wheelbase is very short and compact. However, in the adjusted position of FIG. 2 the wheelbase is substantially longer.

A transversely disposed carriage 41 has spaced elements thereon for cooperative sliding engagement with the spaced apart parallel front arms 13 and 15 which act as tracks. The vertically slidable carriage 41 is provided with forwardly extending lifting forks 42 which are the means for getting under and carrying a load for the unloading vehicle of this invention. As best shown in FIG. 3 a transverse shaft 43 is carried on spaced apart pillow block bearings 44 and 45 which in turn are supported on the top of the top frame member 12. A gear housing 46 is carried on the shaft 43 between its supporting bearings 44 and 45. A hydraulic motor 47 is mounted on the top beam 12 immediately rearwardly of the gear box 46 and imparts a power drive to the box. The gear box 46 is arranged to drive the shaft 43. Sprockets 48 and 49 are mounted on opposite ends of the driven shaft 43. Endless chains 50 and 51 respectively engage and are driven by the sprockets 48 and 49. The lower ends of the endless chains 50 and 51 are mounted on sprockets 48a and 49a which are carried on a cross shaft 43a spanning the lower ends of the frame members 13 and 15 and lying parallel to the fixed cross beam 21. Lug means (not shown) are the means of joining the chains 50 and 51 with the movable carriage 41. Thus, when the shaft 43 is rotated the carriage 41 with its lifting forks 42 are raised or lowered on the vertical tracks 13 and 15 on the front of the vehicle.

As best shown in FIGS. 1, 2, and 3 hydraulic cylinder and piston assemblies 52 and 53 are hingedly mounted at their one ends on the beam assembly 21 at 54 and 55 respectively. The spaced apart, parallel assemblies are closely positioned relative to the link arms 24 and 25 respectively. The other, outer ends of the cylinder and piston assemblies 52 and 53 are hingedly mounted at 56 and 57 on the hydraulic motor housings 28 and 29 respectively. These hydraulic cylinder and piston assemblies have hydraulic fluid delivered thereto at the discretion of the vehicle operator. When he extends the pistons the links 24 and 25 are disposed substantially vertically as shown in FIGS. 1 and 3. And, conversely when he retracts the assemblies the link arms 24 and 25 are swung arcuately upwardly to their positions as shown generally in FIG. 2. In that adjusted position of FIG. 2 the wheelbase is considerably extended and the overall height of the vehicle substantially lowered thereby contributing to a great stability of the vehicle. Also, the load carrying forks 42 are moved to a position between the front and rear wheels of the vehicle. Such shifting also shifts the effective center of gravity of the vehicle and its load so there is no tendency of the vehicle to tip and no requirement of vehicle frame weight for counterbalancing.

Hydraulic cylinder and piston assemblies 58 and 59 are provided at spaced apart positions on the rear wall of the vehicle. The assemblies respectively flank the A-frame members 14 and 16. The upper ends of the assemblies 58 and 59 are respectively hinged at 60 and 61 on the frame members 14 and 16 near the tops thereof. The lower ends of the assemblies are hingedly mounted respectively at the spaced positions 62 and 63 on the box beam 34. When the pistons of the assemblies 58 and 59 are fully extended the vehicle frame is at its maximum height as shown in FIGS. 1 and 3. Conversely when the pistons of these assemblies are retracted the vehicle frame moves down in the rear as shown in the successive stages of FIGS. 6, 5 and then 2. These cylinder and piston assemblies 58 and 59 also receive their power from the engine 23 and are controlled by the operator.

The operator is provided with a seat 64 which is equipped with an undercarriage mounting member 65 for attachment to the cross frame member 22. The seat 64 thus becomes a fixed part of the rigid frame of the vehicle. This means that when the frame is extended to its uppermost position as shown in FIG. 1 the operator will be relatively high to enable him to easily see the load to be carried. Even though the operator is relatively high in this position he is still located near the lower end of the fixed frame of the vehicle. When the adjustable and articulated members mounted at the lower ends of the fixed frame are actuated for a lowering of the vehicle the operator does move substantially nearer the ground. This insures constant good visibility of the load by the operator when he picks it up and when he discharges it from the vehicle.

Another pair of hydraulic cylinder and piston assemblies 66 and 67 is provided at the sides of the vehicle. These assemblies are hingedly mounted at 68 and 69 at their one ends on transversely extending stub shafts 70 and 71 are fixedly carried on frame members 72 and 73 which are respectively fastened by welding or other means to the outer surfaces of the rear frame members 14 and 16 of the A-frames 10 and 11. Inverted L-shaped brackets 74 and 75 are hingedly mounted at 76 and 77 respectively on the outer ends of the assemblies. Cables 78 and 79 are respectively anchored at 80 and 81 to the bracket carrying ends of the assemblies. Pulleys 82 are provided on the frame structure near the top of the vehicle to permit the raising and/or lowering of the hingedly mounted assemblies by the operator's movement of the cables.

Figure 5:
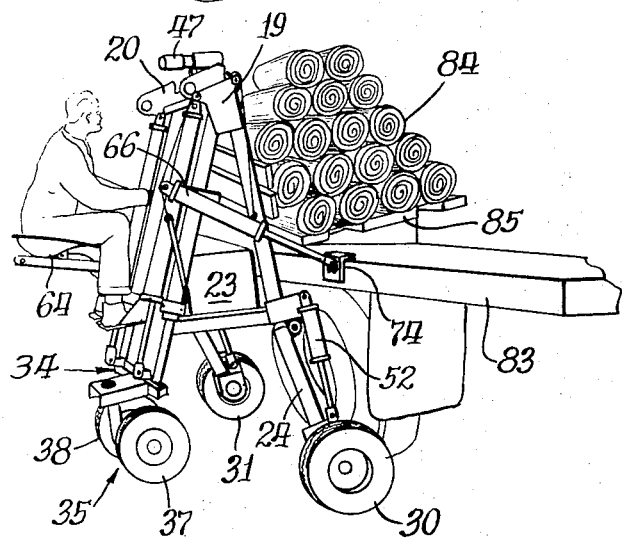
FIG. 5 is a perspective view of the vehicle of this invention shown in the operation of removing a load from a truck bed.
Figure 6:
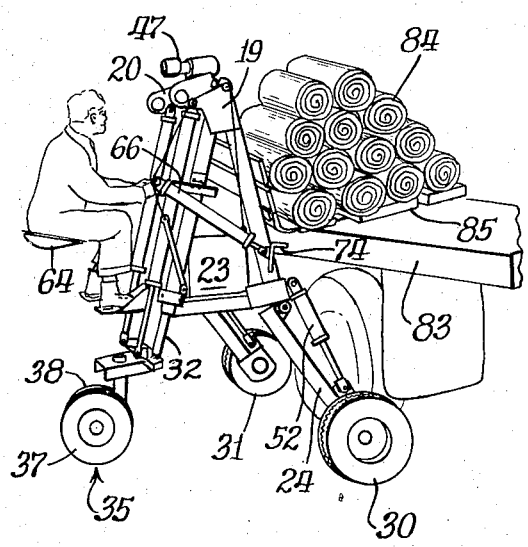
FIG. 6 is another view similar to that shown in FIG. 5 but in an advanced position of removal of the load from the truck bed.
Figure 4:
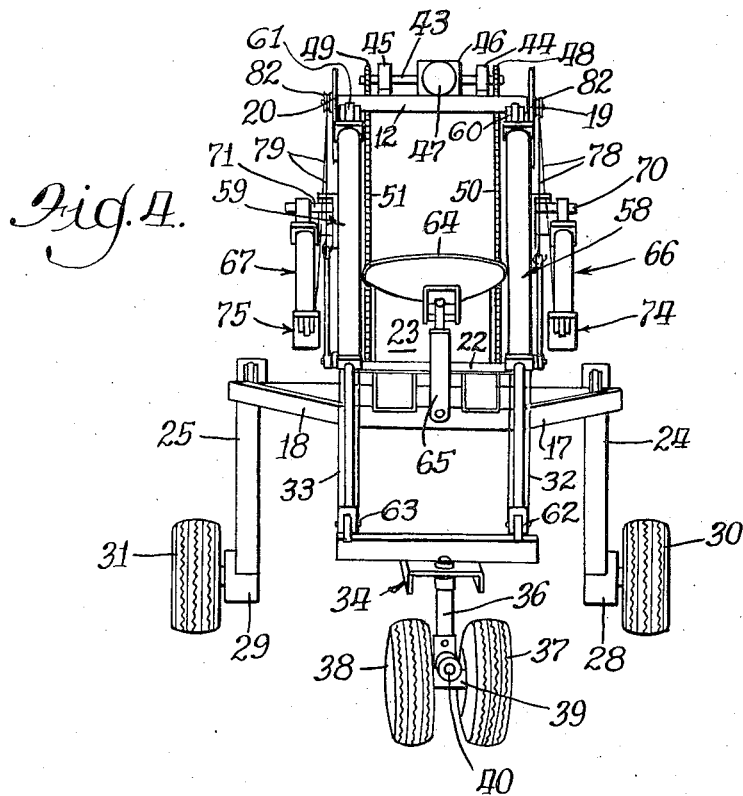
FIG. 4 is a rear elevational view of the vehicle as shown in FIGS. 1 and 3.
Figure 7:
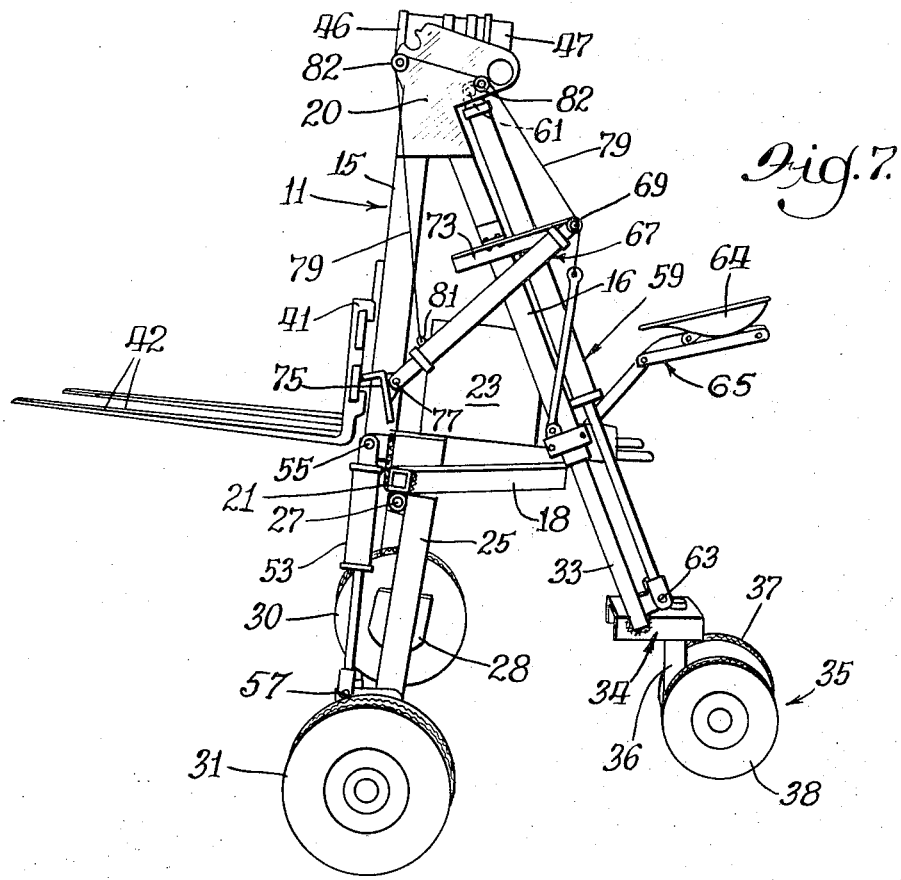
FIG. 7 is a side perspective view of the far side of the vehicle of this invention.

A truck to be unloaded has been pictured to illustrate how the unloader of this invention is used. The truck as shown in FIGS. 5 and 6 is equipped with a generally elevated flat bed 83 on which a load 84 is carried. In the present instance the load has been shown as rolled to illustrate the use of the self propelled unloader of this invention. The sod is comprised of many rolls of sod used to redo lawns. Such sod loads are extremely heavy and most of the loaders presently available on the market are not suitable for outside use. Also, the weight of a standard loader which is large enough to lift the heavy sod would cause the loader to sink into the ground making it unusable for the carrying and laying of sod. The vehicle of this invention is relatively light in and of itself and the load is conveniently carried within the confines of the front and rear wheels of the vehicle. Also, large broad tires may be used for proper flotation of the vehicle over soft ground.

The unloading vehicle of this invention is designed generally for outside operation. Quite often the conditions are wet and muddy and it is essential that the unloader have sufficient flotation and traction without being so heavy as to make these requirements an impossibility. Presently known shop loaders are designed for inside operation where the footing is sure and there is no reason for minimizing the weight of the vehicle. Of course, there are loaders designed for outside use but most of them have quite extended wheelbases and are equipped with weights to counterbalane a load placed on one end thereof.

OPERATION OF THE DEVICE

In the operation of the present invention the steps employed will be shown for the removal of a very heavy load from a relatively elevated surface and safely bringing that load down near the ground for transport of the load on the vehicle or for the actual use of the load. When the load is rolled sod, such sod may be unrolled and laid directly from the unloading vehicle. The very compact vehicle of the present invention in the arrangement of FIG. 1 is driven to a position closely adjacent the bed 83 of a truck to be unloaded. The lifting forks 42 are positioned under the skid 85 carrying the truck load 84. At this time the operator positions his pusher means, the hydraulic cylinder and piston assemblies 66 and 67, so that the inverted L-shaped brackets 74 and 75 may grip and push against the edge of the truck bed 83. These pushers or brace members are then extended and the load 84 is raised slightly from the truck bed. Now, the lifting forks 42 are raised a small amount to provide space between the bed and the lifting forks. At this point the operator causes the telescopic members 14–32 and 16–33 to contract. This action causes the rear of the vehicle to be lowered and the result is that the load over the truck bed starts to swing or rock rearwardly away from the truck. Now, the operator causes the rocking link members 24 and 25 at the front of the vehicle to be swung about their pivots 26 and 27 respectively. This causes the effective shifting of the load 84 further rearwardly, especially in relation to the front driving wheels 30 and 31. When the lifting forks 42 are clear of the truck bed 83 the forks are lowered and the load brought down near to the ground for transport. In this adjusted position as illustrated in FIG. 2 of the drawings the vehicle has an extended wheel base and the load is effectively carried between the front wheels 30 and 31, and the rear caster wheels 37 and 38 of the vehicle. The load and the vehicle combined thus has its center of gravity effectively shifted from a position forwardly of the front driving wheels to a position rearwardly thereof between the front and rear wheels. The result is a lightweight, compact, versatile, and quite stable self propelled unloader fully capable of handling heavy and bulky loads with ease.

I am aware that numerous details of construction may be changed without departing from the principles disclosed herein and I therefore do not propose limiting the patent granted hereon otherwise than as necessitated by the appended claims.

What is claimed is:

1. A self propelled unloading vehicle comprising a generally rigid A-frame, one leg of said A-frame constituting the front member of said vehicle, the other leg of said A-frame constituting the rear member of said vehicle, link means having one end pivotally mounted on the lower end of said front member, driving wheel means carried on the other end of said link means, means adjusting the angular disposition of the link means relative to the front member, an extension member telescoped within the rear member of the vehicle, caster wheel means carried on the lower end of said extension member, means for adjustably extending or retracting said extension member, means vertically moving up and down on said front member for effecting the removal of a load from a raised support bed, and means removably bracing and pushing of said A-frame relative to said raised support bed.

2. A vehicle as set forth in claim 1 in which said means adjusting the angular disposition of the link means comprises a hydraulic cylinder and piston, said means adjustably extending or retracting the extension member comprises a hydraulic cylinder and piston, and said means removably bracing said A-frame relative to said raised support bed comprising a hydraulic cylinder and piston.

3. A self propelled unloading vehicle comprising a pair of generally rigid A-frames arranged in spaced apart relation, fixed cross members joining the sides of said pair of rigid A-frames, a power source carried between said spaced apart A-frames, the corresponding one leg of each of said A-frames together with fixed cross members constituting the front of said vehicle, the corresponding other leg of each of said A-frames with fixed cross members together constituting the rear of said vehicle, spaced apart link members pivotally mounted in transverse alignment by their one ends near the lower outside of the front of said vehicle, lifting elements on said front for carrying a load, means joining said lifting elements and said power source for raising and lowering said lifting elements relative to said front, a wheel carried on each of said other free ends of said link members, means imparting drive to said wheels from said power source, means for adjusting the angular disposition of the link members relative to the front of said vehicle, an extension member telescoped within each of the other legs of said A-frame constituting the rear of the vehicle, caster wheel means carried on the outer end of said extension members, means for adjustably extending or retracting said extension members, and an operators seat mounted on the rear of said vehicle.

* * * * *